US012651048B2

(12) United States Patent
Yamada

(10) Patent No.: US 12,651,048 B2
(45) Date of Patent: Jun. 9, 2026

(54) SYSTEM AND INFORMATION PROCESSING METHOD

(71) Applicant: Japan Tobacco Inc., Tokyo (JP)

(72) Inventor: Manabu Yamada, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 18 days.

(21) Appl. No.: 18/826,238

(22) Filed: Sep. 6, 2024

(65) Prior Publication Data

US 2024/0427861 A1     Dec. 26, 2024

Related U.S. Application Data

(63) Continuation of application No. PCT/JP2022/013533, filed on Mar. 23, 2022.

(51) Int. Cl.
H04L 29/06      (2006.01)
G05B 19/4155    (2006.01)
G06F 21/31      (2013.01)

(52) U.S. Cl.
CPC ......... G06F 21/31 (2013.01); G05B 19/4155 (2013.01); G05B 2219/50333 (2013.01)

(58) Field of Classification Search
CPC ...... G05B 19/4155; G05B 2219/50333; G06F 21/31
See application file for complete search history.

(56) References Cited

U.S. PATENT DOCUMENTS

2020/0329775 A1   10/2020 Doyle et al.
2023/0028709 A1*   1/2023 Fuchs ................... A61B 5/0022
2023/0248065 A1*   8/2023 Libine .................... A24F 40/50
                                                        131/329

FOREIGN PATENT DOCUMENTS

CN       108523244 A    9/2018
JP       2021528979 A   10/2021
WO       2019/104227 A1   5/2019

OTHER PUBLICATIONS

Japanese Office Action issued May 20, 2025 in corresponding Japanese Patent Application No. 2024-508899, 10 1 pages.
International Search Report and Written Opinion mailed on Jun. 7, 2022, received for PCT Application No. PCT/JP2022/013533, filed on Mar. 23, 2022, 9 pages including English Translation.

* cited by examiner

*Primary Examiner* — Evans Desrosiers
(74) *Attorney, Agent, or Firm* — XSENSUS LLP

(57)          ABSTRACT

A system comprising: an inhalation device that generates an aerosol by heating an aerosol source on the basis of control information which defines a parameter pertaining to the temperature to which the aerosol source is to be heated; a terminal device that receives an operation for generating the control information; and a control device that associates a user and a right granted to the user and stores the same, wherein the terminal device and/or the control device carry out a process pertaining to the control information generation and corresponding to the right granted to the user of the terminal device.

20 Claims, 6 Drawing Sheets

SYSTEM AND INFORMATION PROCESSING METHOD

CROSS-REFERENCE TO RELATED APPLICATION

This application is a Continuation of PCT International Application No. PCT/JP2022/013533, filed on Mar. 23, 2022, which is hereby expressly incorporated by reference into the present application.

TECHNICAL FIELD

The present invention relates to a system and an information processing method.

BACKGROUND ART

Inhaler devices, such as electronic cigarettes and nebulizers, which generate substances for users to inhale, are widespread. For example, an inhaler device uses an aerosol source to generate an aerosol and a substrate that includes, for example, a flavor source to impart a flavor component to the generated aerosol. This results in an aerosol with a flavor component imparted. The user can taste the flavor by inhaling the aerosol generated by the inhaler device, which contains the flavor component imparted. The action of the user inhaling the aerosol is hereinafter also referred to as a puff or a puff action.

The preference for the flavor tasted during a puff (hereinafter also referred to as the "smoke taste") varies from user to user. Therefore, it is preferable that the temperature at which the aerosol source is heated, which directly affects the smoke taste, can be customized by the user. Patent Literature 1, mentioned below, discloses techniques that allow users to customize the temperature at which the aerosol source is heated.

CITATION LIST

Patent Literature

Patent Literature 1: WO 2019/104227 A1

SUMMARY OF INVENTION

Technical Problem

However, with the techniques disclosed in Patent Literature 1 mentioned above, it is sometimes difficult for users to make the desired customization. This is because there is a complex relationship between the temperature at which the aerosol source is heated and the smoke taste. In particular, it has been difficult for users with low proficiency in customization to make the customization as they please.

Therefore, the present invention has been made in view of the above issue, and it is an object of the present invention to provide a mechanism that can provide a customization method suitable for each user.

Solution to Problem

To solve the problem mentioned above, according to one aspect of the present invention, there is provided a system including: an inhaler device that generates an aerosol by heating an aerosol source based on control information defining a parameter regarding a temperature at which the aerosol source is heated; a terminal device that accepts an operation for generating the control information; and a control device that stores a user and an authorization granted to the user in association, wherein at least one of the terminal device or the control device performs processing regarding generation of the control information according to the authorization granted to a user of the terminal device.

The control information may include information defining a time series transition of the parameter, and the terminal device may accept an operation to set a target temperature at an arbitrary time from a first authorized user and an operation to set a target temperature at puff timing from a second authorized user different from the first authorized user.

The terminal device may generate the control information based on an operation by a first authorized user, and the control device may generate the control information based on an operation on the terminal device by a second authorized user different from the first authorized user.

The control device may publish the control information generated based on an operation by a first authorized user on a web to be downloadable, and the inhaler device or the terminal device may receive the control information generated based on an operation by the first authorized user or a second authorized user different from the first authorized user from another inhaler device or another terminal device.

The control device may grant a reward to a user according to a number of downloads or uses of the control information generated based on an operation by the user, and a unit price of the reward granted to a first authorized user may be higher than a unit price of the reward granted to a second authorized user different from the first authorized user.

The terminal device may accept setting of a comment for the generated control information, and types of the comment that a first authorized user can set may be more numerous than types of the comment that a second authorized user different from the first authorized user can set.

The terminal device may accept setting of the parameter from a user, and granularity of the parameter that a first authorized user can set may be finer than granularity of the parameter that a second authorized user different from the first authorized user can set.

The terminal device may accept setting of the parameter from a user, and a range of the parameter that a first authorized user can set may be wider than a range of the parameter that a second authorized user different from the first authorized user can set.

The control information may include information defining a time series transition of the parameter, and a range of time during which a first authorized user can set the parameter may be wider than a range of time during which a second authorized user different from the first authorized user can set the parameter.

The control device may switch the authorization granted to a user according to at least one of a number of downloads, a number of uses, or a rating from another user of the control information generated based on an operation by the user.

The inhaler device may generate an aerosol using a substrate including an aerosol source, and the control device may publish the control information regarding a particular inhaler device or a particular substrate, generated based on an operation by a first authorized user, on a web to be downloadable at a time earlier than the control information generated based on an operation by a second authorized user.

Additionally, to solve the problem mentioned above, according to another aspect of the present invention, there is provided an information processing method including: storing a user and an authorization granted to the user in association; accepting an operation for generating control information defining a parameter regarding a temperature at which an aerosol source is heated, the control information being used by an inhaler device that generates an aerosol by heating the aerosol source based on the control information; and performing processing regarding generation of the control information according to the authorization granted to the user.

Advantageous Effects of Invention

According to the present invention as described above, a mechanism capable of providing a customization method suitable for each user is provided.

DESCRIPTION OF EMBODIMENTS

Figure 1:
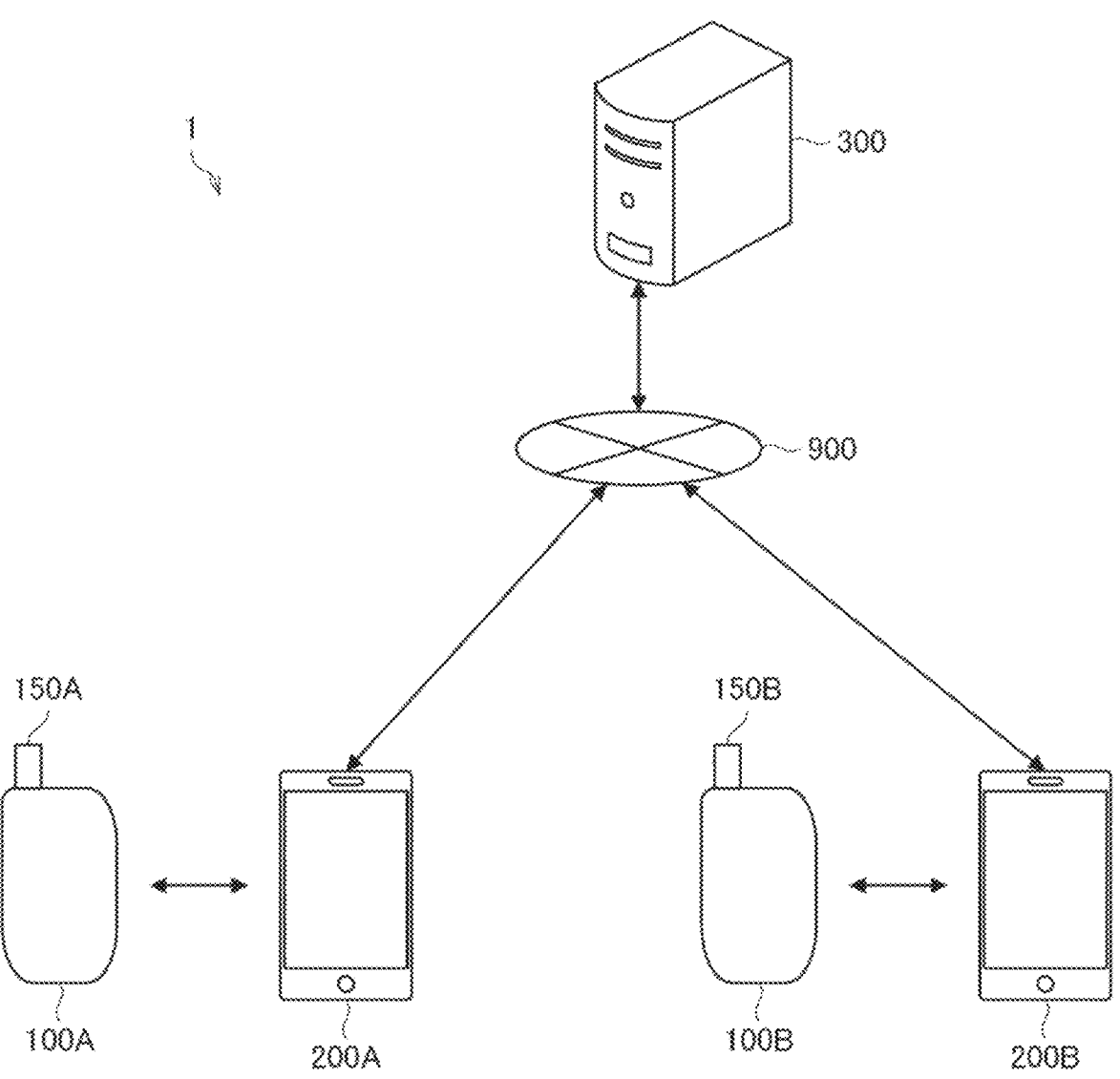
FIG. 1 is a diagram illustrating a configuration example of a system according to the present embodiment.

A preferred embodiment of the present invention will be described in detail below with reference to the accompanying drawings. Note that, in the present specification and drawings, structural elements having substantially the same functional configuration are denoted by the same reference numeral and overlapping descriptions are omitted.

Also, in the present specification and drawings, elements having substantially the same functional configuration may be distinguished by adding different alphabet characters after the same reference numeral. For example, multiple elements having substantially the same functional configuration are distinguished as appropriate, such as an inhaler device 100A and an inhaler device 100B. However, if it is not necessary to particularly distinguish each of multiple elements having substantially the same functional configuration, they are denoted by the same reference numeral. For example, if it is not necessary to particularly distinguish between the inhaler device 100A and the inhaler device 100B, they are simply referred to as the inhaler devices 100.

1. Configuration Example

FIG. 1 is a diagram illustrating a configuration example of a system 1 according to the present embodiment. As illustrated in FIG. 1, the system 1 includes multiple inhaler devices 100 (100A and 100B), multiple terminal devices 200 (200A and 200B), and a server 300.

Each of the inhaler devices 100 is a device that generates a substance inhaled by a user. Hereinafter, the substance generated by the inhaler device 100 will be described as being an aerosol. The inhaler device 100 is an example of an aerosol generating device that generates an aerosol. Alternatively, the substance generated by the inhaler device 100 may be a gas. The inhaler device 100 can accommodate a stick substrate 150. The inhaler device 100 uses the accommodated stick substrate 150 to generate an aerosol. The stick substrate 150 is an example of a substrate that contributes to the generation of an aerosol. The stick substrate 150 contains an aerosol source. The inhaler device 100 generates an aerosol by heating the accommodated stick substrate 150.

The terminal devices 200 are devices used by the users of the inhaler devices 100. Each terminal device 200 is associated with a corresponding one of the inhaler devices 100. The inhaler device 100 and the terminal device 200 may have been paired in advance for wireless communication, or the fact that the user of the inhaler device 100 is identical to the user of the terminal device 200 may be registered in advance with the server 300. The terminal device 200 may be any device, such as a smartphone, a tablet terminal, a wearable device, or a PC (Personal Computer). Alternatively, the terminal device 200 may be a charger that charges the inhaler device 100.

The server 300 is a control device that manages the information about each device included in the system 1. The server 300 communicates with the terminal devices 200 via a network 900. In particular, the server 300 communicates indirectly with the inhaler devices 100 via the terminal devices 200. The server 300 may perform various processes based on information collected from the inhaler devices 100 via the terminal devices 200. Alternatively, the server 300 may perform various processes based on user operations performed on the terminal devices 200.

(1) Configuration Example of Inhaler Device

Figures 2, 3:
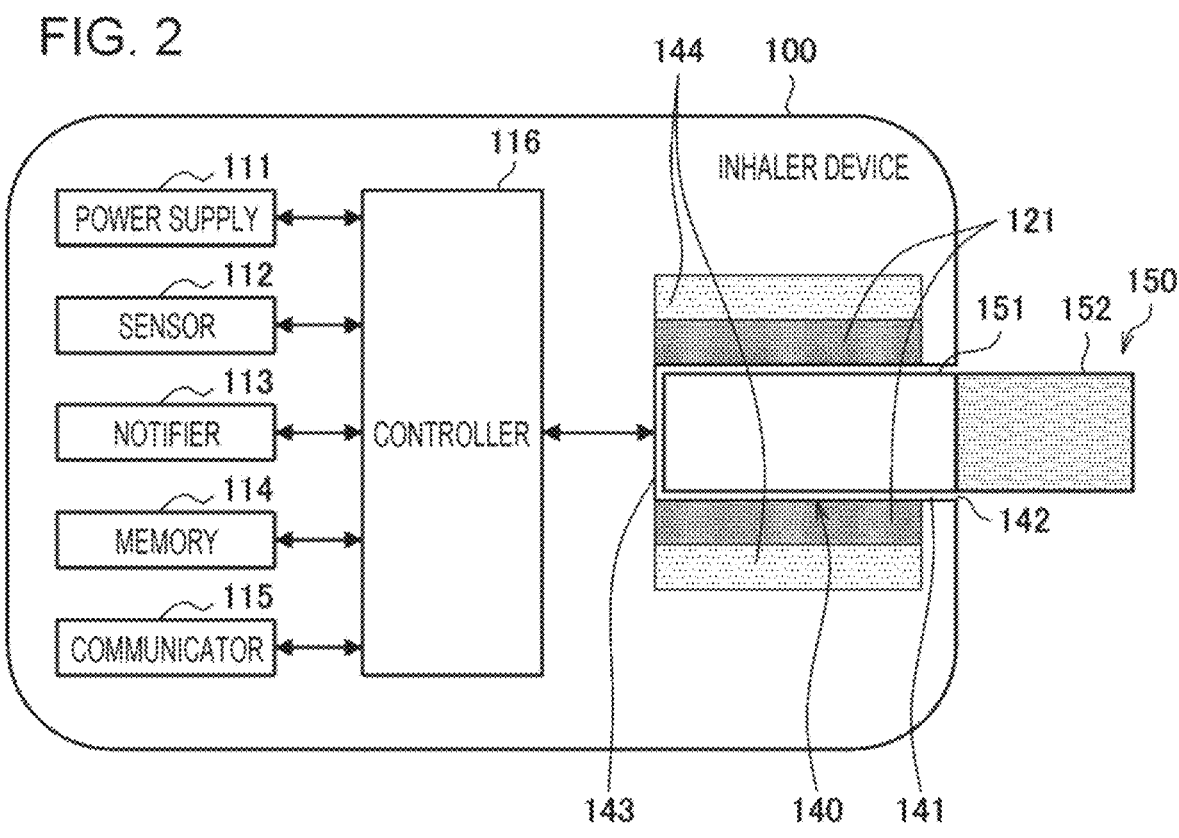
FIG. 2 is a schematic diagram schematically illustrating a configuration example of an inhaler device according to the present embodiment.
FIG. 3 is a block diagram illustrating a configuration example of a terminal device according to the present embodiment.

FIG. 2 is a schematic diagram schematically illustrating a configuration example of the inhaler device according to the present embodiment. As shown in FIG. 2, the inhaler device 100 includes a power supply 111, a sensor 112, a notifier 113, a memory 114, a communicator 115, a controller 116, a heater 121, a holder 140, and a heat insulator 144.

The power supply 111 stores electric power. The power supply 111 supplies electric power to the structural elements of the inhaler device 100 under the control of the controller 116. The power supply 111 may be a rechargeable battery such as a lithium ion secondary battery.

The sensor 112 acquires various items of information regarding the inhaler device 100. In an example, the sensor 112 may be a pressure sensor such as a condenser microphone, a flow sensor, or a temperature sensor, and acquire a value generated in accordance with the user's inhalation. In another example, the sensor 112 may be an input device that receives information input by the user, such as a button or a switch.

The notifier 113 provides information to the user. The notifier 113 may be a light-emitting device that emits light, a display device that displays an image, a sound output device that outputs sound, or a vibration device that vibrates.

The memory 114 stores various items of information for operation of the inhaler device 100. The memory 114 may be a non-volatile storage medium such as flash memory.

The communicator 115 is a communication interface capable of communication in conformity with any wired or wireless communication standard. Such a communication standard may be, for example, Wi-Fi (registered trademark), Bluetooth (registered trademark), near-field communication (NFC), or a standard using a low-power wide area (LPWA).

The controller 116 functions as an arithmetic processing unit and a control circuit, and controls the overall operations of the inhaler device 100 in accordance with various programs. The controller 116 includes an electronic circuit such as a central processing unit (CPU) or a microprocessor, for example.

The holder 140 has an internal space 141, and holds the stick substrate 150 in a manner partially accommodated in the internal space 141. The holder 140 has an opening 142 that allows the internal space 141 to communicate with outside. The holder 140 accommodates the stick substrate 150 that is inserted into the internal space 141 through the opening 142. For example, the holder 140 may be a tubular body having the opening 142 and a bottom 143 on its ends, and may define the pillar-shaped internal space 141. The holder 140 connects with an airflow path that supplies air to the internal space 141. For example, a side surface of the inhaler device 100 has an air inlet hole that is an inlet of air into the airflow path. For example, the bottom 143 has an air outlet hole that is an outlet of the air from the airflow path to the internal space 141.

The stick substrate 150 includes a substrate 151 and an inhalation port 152. The substrate 151 includes an aerosol source. The aerosol source is, for example, a polyhydric alcohol such as glycerin and propylene glycol, and a liquid such as water. The aerosol source may include a flavor component that is either derived from tobacco or not derived from tobacco. For the inhaler device 100 that is a medical inhaler such as a nebulizer, the aerosol source may include a medicine. Note that, in the present configuration example, the aerosol source is not limited to a liquid, and may be a solid. The stick substrate 150 held by the holder 140 includes the substrate 151 at least partially accommodated in the internal space 141 and the inhalation port 152 at least partially protruding from the opening 142. When the user inhales with the inhalation port 152 protruding from the opening 142 in his/her mouth, air flows into the internal space 141 through the airflow path (not illustrated), and the air and an aerosol generated from the substrate 151 reach inside the mouth of the user.

The heater 121 heats the aerosol source to atomize the aerosol source and generate the aerosol. In the example illustrated in FIG. 2, the heater 121 has a film-like shape and surrounds the outer circumference of the holder 140. Subsequently, heat produced from the heater 121 heats the substrate 151 of the stick substrate 150 from the outer circumference, generating the aerosol. The heater 121 produces heat when receiving electric power from the power supply 111. In an example, the electric power may be supplied in response to the sensor 112 detecting a start of the user's inhalation and/or an input of predetermined information. Subsequently, the supply of the electric power may be stopped in response to the sensor 112 detecting an end of the user's inhalation and/or an input of predetermined information.

The heat insulator 144 prevents heat from transferring from the heater 121 to the other structural elements. For example, the heat insulator 144 may be a vacuum heat insulator or an aerogel heat insulator.

The configuration example of the inhaler device 100 has been described above. The inhaler device 100 is not limited to the above configuration, and may be configured in various ways as exemplified below.

In an example, the heater 121 may have a blade-like shape, and may be disposed so that the heater 121 protrudes from the bottom 143 of the holder 140 toward the internal space 141. In this case, the heater 121 having the blade-like shape is inserted into the substrate 151 of the stick substrate 150 and heats the substrate 151 of the stick substrate 150 from its inside. In another example, the heater 121 may be disposed so that the heater 121 covers the bottom 143 of the holder 140. In still another example, the heater 121 may be implemented as a combination of two or more selected from a first heater that covers the outer circumference of the holder 140, a second heater having the blade-like shape, and a third heater that covers the bottom 143 of the holder 140.

In another example, the holder 140 may include an opening/closing mechanism that at least partially opens and closes an outer shell defining the internal space 141. Examples of the opening/closing mechanism include a hinge. In addition, the holder 140 may sandwich the stick substrate 150 while sandwiching the stick substrate 150 inserted into the internal space 141 by opening and closing the outer shell. In this case, the heater 121 may be at the sandwiching position of the holder 140 and may produce heat while pressing the stick substrate 150.

In addition, means for atomizing the aerosol source is not limited to heating by the heater 121. For example, the means for atomizing the aerosol source may be induction heating. In this case, the inhaler device 100 includes at least an electromagnetic induction source such as a coil that generates a magnetic field instead of the heater 121. The inhaler device 100 may be provided with a susceptor that produces heat by the induction heating, or the stick substrate 150 may include the susceptor.

Note that the inhaler device 100 cooperates with the stick substrate 150 to generate an aerosol to be inhaled by the user. Therefore, the combination of the inhaler device 100 and the stick substrate 150 may be conceived as an aerosol generating system.

(2) Configuration Example of Terminal Device

FIG. 3 is a block diagram illustrating a configuration example of the terminal device 200 according to the present embodiment. As illustrated in FIG. 3, the terminal device 200 includes an input unit 210, an output unit 220, a detector 230, a communicator 240, a memory 250, and a controller 260.

The input unit 210 has a function of accepting an input of various types of information. The input unit 210 may include an input device that accepts an input of information from a user. Examples of the input device include buttons, a keyboard, a touchscreen, and a microphone. Additionally, the input unit 210 may include various sensors including an image sensor.

The output unit 220 has a function of outputting information. The output unit 220 may include an output device that outputs information to the user. Examples of the output device include a display device that displays information, a light-emitting device that emits light, a vibration device that vibrates, and a sound output device that outputs sound. An example of the display device is a display. An example of the light-emitting device is an LED (Light Emitting Diode). An example of the vibration device is an eccentric motor. An example of the sound output device is a speaker. By outputting information input from the controller 260, the output unit 220 notifies the user of the information.

The detector 230 has a function of detecting information about the terminal device 200. The detector 230 may detect location information of the terminal device 200. For example, the detector 230 receives a GNSS (Global Navigation Satellite System) signal from a GNSS satellite (such as a GPS (Global Positioning System) signal from a GPS satellite) to detect location information consisting of the latitude and longitude of the device. The detector 230 may detect movement of the terminal device 200. For example, the detector 230 includes a gyroscope and an acceleration sensor to detect angular velocity and acceleration.

The communicator 240 is a communication interface for transmitting and receiving information between the terminal device 200 and other devices. The communicator 240 performs communication in conformity with any wired or wireless communication standard. Such a communication standard may be, for example, USB (Universal Serial Bus), Wi-Fi (registered trademark), Bluetooth (registered trademark), NFC (Near Field Communication), or a standard using an LPWA (Low Power Wide Area).

The memory 250 stores various types of information. The memory 250 may be a non-volatile storage medium such as flash memory.

The controller 260 functions as an arithmetic processing unit or a control circuit, and controls the overall operations of the terminal device 200 in accordance with various programs. The controller 260 is implemented by an electronic circuit such as a CPU (Central Processing Unit) or a microprocessor, for example. Additionally, the controller 260 may include a ROM (Read Only Memory) to store programs, operation parameters, and the like to be used, and a RAM (Random Access Memory) to temporarily store the parameters and the like that change accordingly. The terminal device 200 executes various processes under the control of the controller 260. The processing of information input by the input unit 210, the output of information by the output unit 220, the detection of information by the detector 230, the transmission and reception of information by the communicator 240, and the storage and retrieval of information by the memory 250 are examples of processes under the control of the controller 260. Other processes executed by the terminal device 200, such as inputting information to the structural elements and processing based on the information output from the structural elements, are also under the control of the controller 260.

Note that the functions of the controller 260 may be implemented using an application. The application may be pre-installed or downloaded. In addition, the functions of the controller 260 may be implemented by PWA (Progressive Web Apps).

(3) Configuration Example of Server

Figure 4:
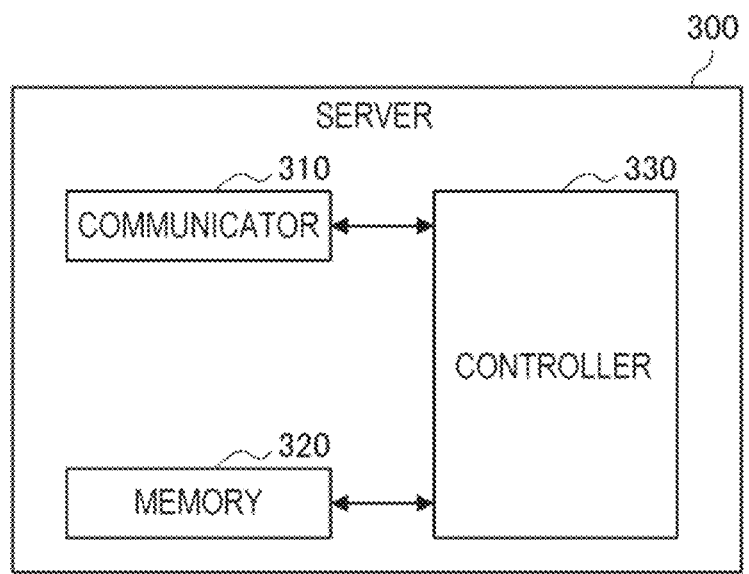
FIG. 4 is a block diagram illustrating an example configuration of a server according to the present embodiment.

FIG. 4 is a block diagram illustrating a configuration example of the server 300 according to the present embodiment. As illustrated in FIG. 4, the server 300 includes a communicator 310, a memory 320, and a controller 330.

The communicator 310 is a communication interface for transmitting and receiving information between the server 300 and other devices. The communicator 310 performs communication in conformity with any wired or wireless communication standard.

The memory 320 stores various items of information for operation of the server 300. The memory 320 may be a non-volatile storage medium such as an HDD (Hard Disc Drive) and an SSD (Solid State Drive).

The controller 330 functions as an arithmetic processing unit and a control circuit, and controls the overall operations of the server 300 in accordance with various programs. The controller 330 includes an electronic circuit such as a CPU (Central Processing Unit) and a microprocessor, for example. Additionally, the controller 330 may include a ROM (Read Only Memory) to store programs, operation parameters, and the like to be used, and a RAM (Random Access Memory) to temporarily store the parameters and the like that change accordingly. The server 300 executes various processes under the control of the controller 330. The transmission and reception of information by the communicator 310, and the storage and retrieval of information by the memory 320 are examples of processes under the control of the controller 330. Other processes executed by the server 300, such as inputting information to the structural elements and processing based on the information output from the structural elements, are also under the control of the controller 330.

2. Technical Features

(1) Heating Profile

The controller 116 controls operation of the heater 121 based on a heating profile. Control of operation of the heater 121 is implemented by controlling the supply of electric power from the power supply 111 to the heater 121. The heater 121 heats the stick substrate 150 using the electric power supplied from the power supply 111.

A heating profile is control information for controlling the temperature at which the aerosol source is heated. The heating profile defines parameters regarding the temperature at which the aerosol source is heated. An example of the temperature at which the aerosol source is heated is the temperature of the heater 121. An example of the parameters regarding the temperature at which the aerosol source is heated is the target value of the temperature of the heater 121 (hereinafter also referred to as the target temperature). The temperature of the heater 121 may be controlled to change according to the elapsed time since the start of heating. In that case, the heating profile includes information defining a time series transition of the target temperature. In another example, the heating profile may include parameters that define a method of supplying electric power to the heater 121 (hereinafter also referred to as power supply parameters). The power supply parameters include, for example, the voltage applied to the heater 121, the ON/OFF of the supply of electric power to the heater 121, the feedback control method to be adopted, etc. The ON/OFF of the supply of electric power to the heater 121 may be perceived as the ON/OFF of the heater 121.

The controller 116 controls operation of the heater 121 such that the temperature of the heater 121 (hereinafter also referred to as the actual temperature) transitions in the same manner as the target temperature defined in the heating profile. The heating profile is typically designed to optimize the flavor the user tastes when inhaling an aerosol generated from the stick substrate 150. Thus, controlling operation of the heater 121 based on the heating profile can optimize the flavor the user tastes.

Temperature control of the heater 121 can be implemented by known feedback control, for example. Feedback control may be performed by, for example, a PID controller (Proportional-Integral-Differential Controller). The controller 116 may cause the electric power from the power supply 111 to be supplied to the heater 121 in the form of pulses by pulse width modulation (PWM) or pulse frequency modulation (PFM). In that case, the controller 116 is able to control the temperature of the heater 121 by adjusting the duty ratio or frequency of the electric power pulses in the feedback control. Alternatively, the controller 116 may perform simple ON/OFF control in the feedback control. For example, the controller 116 may execute heating by the heater 121 until the actual temperature reaches the target temperature, interrupt the heating by the heater 121 when the actual temperature reaches the target temperature, and resume the heating by the heater 121 when the actual temperature falls below the target temperature.

The temperature of the heater 121 can be quantified, for example, by measuring or estimating the electrical resistance of the heater 121 (more precisely, a heat generating resistor constituting the heater 121). This is because the electrical resistance of the heat generating resistor changes according to the temperature. The electrical resistance of the heat generating resistor can be estimated, for example, by measuring the amount of voltage drop in the heat generating resistor. The amount of voltage drop in the heat generating resistor can be measured by a voltage sensor that measures the potential difference applied to the heat generating resistor. In another example, the temperature of the heater 121 can be measured by a temperature sensor, such as a thermistor, installed in the vicinity of the heater 121.

The period from the start to the end of a process of generating an aerosol using the stick substrate 150 is hereinafter also referred to as a heating session. In other words, a heating session is a period during which the supply of electric power to the heater 121 is controlled based on a heating profile. The start of the heating session is when the heating based on the heating profile is started. The end of the heating session is when a sufficient amount of aerosol is no longer generated. The heating session includes a pre-heating period in the first half and a puff-enabled period in the second half. A puff-enabled period is a period during which a sufficient amount of aerosol is assumed to be generated. A pre-heating period is a period from the start of heating to the start of a puff-enabled period. Heating performed during a pre-heating period is also referred to as pre-heating.

The notifier 113 may notify the user of information indicating the timing at which the preheating ends. For example, the notifier 113 notifies the user of information indicating that the pre-heating is about to end before it actually ends, or of information indicating that the pre-heating has ended at the moment it actually ends. The user may be notified, for example, by the LED lighting up or through vibrations. Based on this information, the user is able to start puffing immediately after the pre-heating ends.

Likewise, the notifier 113 may notify the user of information indicating the timing at which the puff-enabled period ends. For example, the notifier 113 notifies the user of information indicating that the puff-enabled period is about to end before it actually ends, or of information indicating that the puff-enabled period has ended at the moment it actually ends. The user may be notified, for example, by the LED lighting up or through vibrations. Based on this information, the user is able to puff until the puff-enabled period ends.

Figure 5:
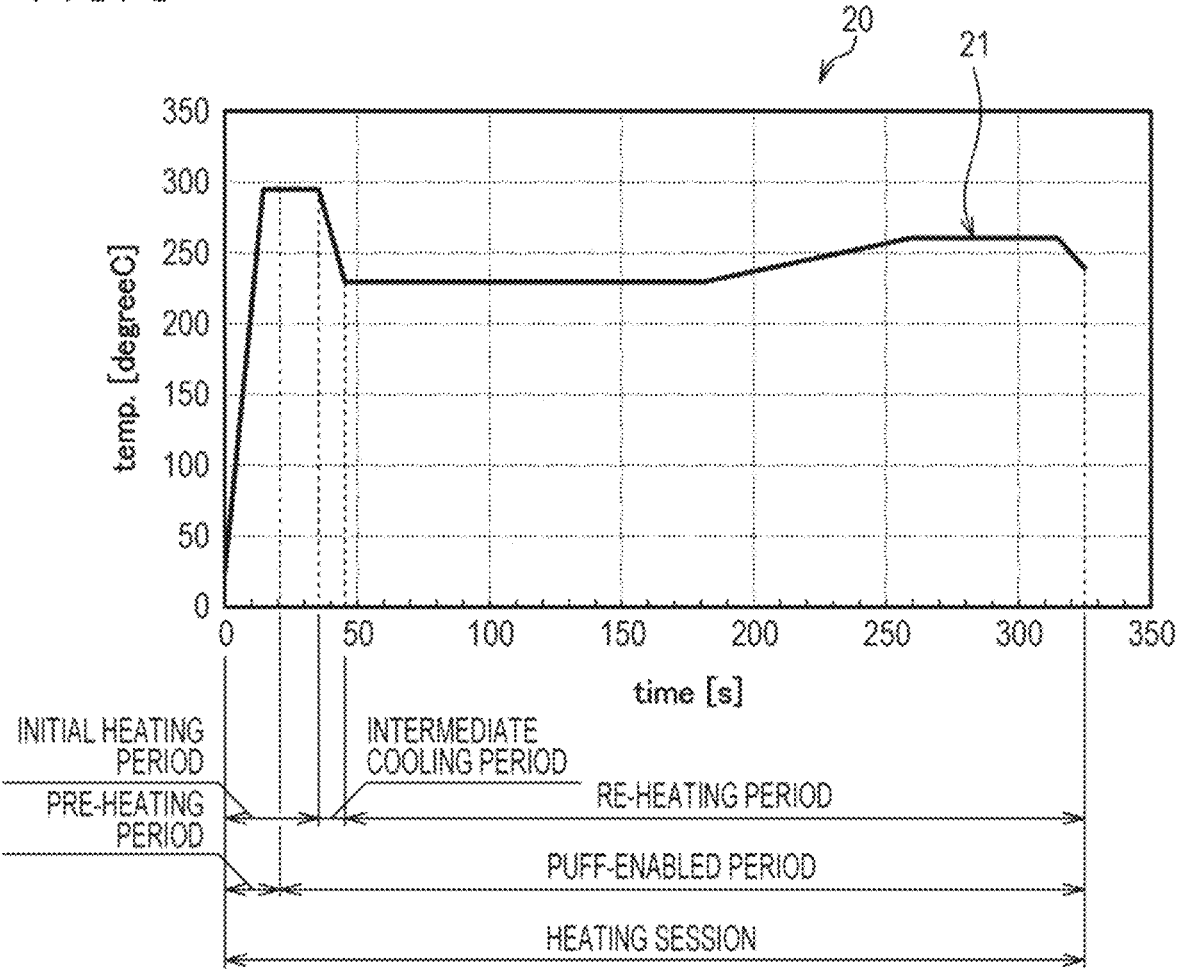
FIG. 5 is a graph schematically illustrating an example of a heating profile.

An example of a heating profile will be described with reference to FIG. 5. FIG. 5 is a graph schematically illustrating an example of a heating profile. In a graph 20, time is plotted on the horizontal axis. In the graph 20, temperature is plotted on the vertical axis. A line 21 indicates a time series transition of the target temperature. As illustrated in FIG. 5, a heating session may sequentially include an initial heating period, an intermediate cooling period, and a re-heating period. The initial heating period is the period during which the temperature of the heater 121 rapidly rises and is maintained at a high temperature after the start of heating. The intermediate cooling period is the period during which the temperature of the heater 121 decreases after the initial heating period. The re-heating period is the period during which the temperature of the heater 121 rises again after the intermediate cooling period. In the example illustrated in FIG. 5, the target temperature rises rapidly to around 300° C. during the initial heating period, then decreases to around 230° C. during the intermediate cooling period, and then rises gradually to around 260° C. during the re-heating period. During the intermediate cooling period, the supply of electric power to the heater 121 may be interrupted and the heating may be turned OFF. In the example illustrated in FIG. 5, the pre-heating period is from the start of heating to the middle of the initial heating period, and the puff-enabled period is from the middle of the initial heating period to the end of the re-heating period.

(2) Authorizations

Users are granted authorizations regarding heating profiles. The stronger the level of authorization granted to the user, the more freedom the user can enjoy with respect to the use or generation of heating profiles. Authorizations granted to users will be described with reference to FIG. 6.

Figures 6, 7:
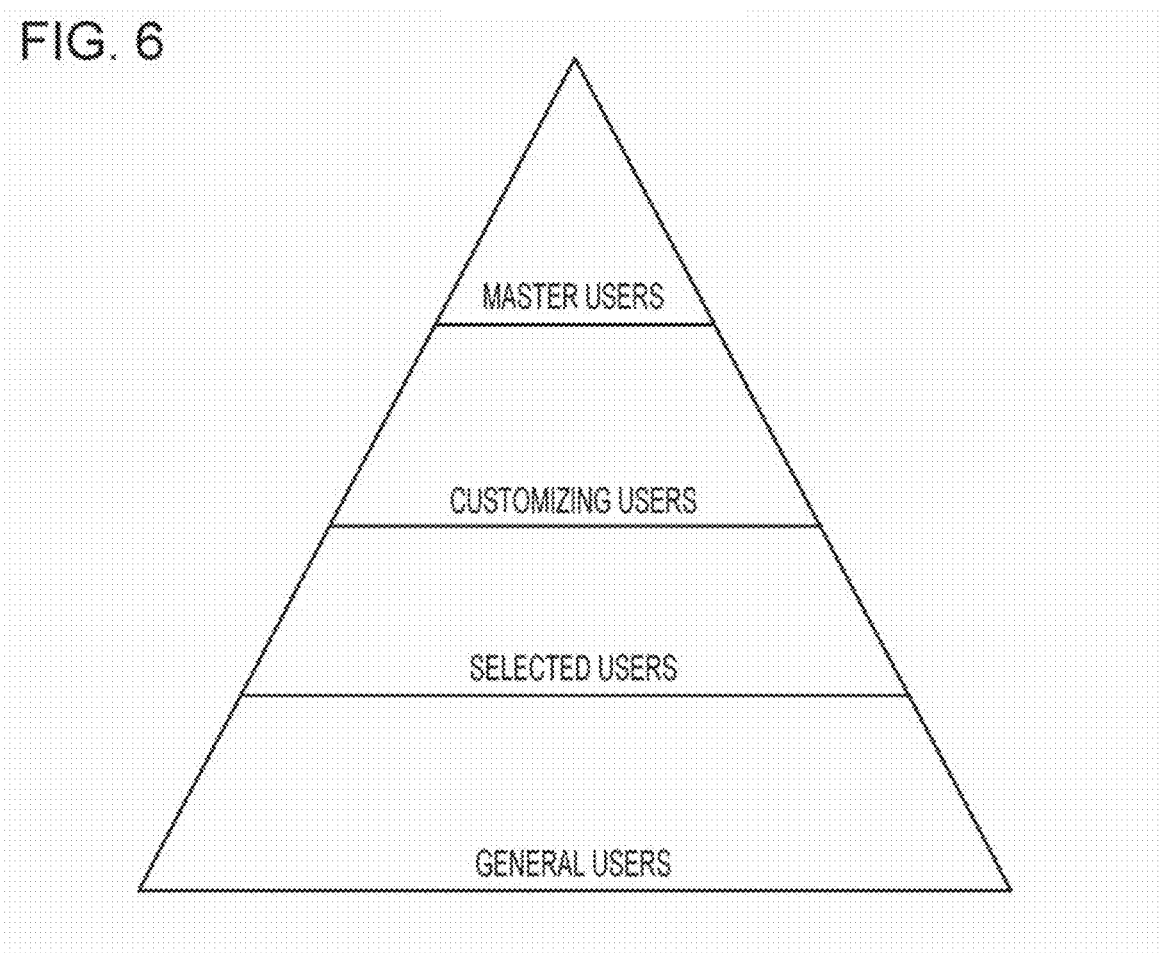
FIG. 6 is a diagram for describing an example of authorizations granted to users.
FIG. 7 is a diagram illustrating an example of an input screen for smoke taste evaluation, displayed by the terminal device according to the present embodiment.

FIG. 6 is a diagram for describing an example of authorizations granted to users. As illustrated in FIG. 6, users are categorized into general users, selected users, customizing users, or master users, in order from those with the weakest to the strongest authorization granted. An authorization granted to general users is also referred to as general authorization. An authorization granted to selected users is also referred to as selected authorization. An authorization granted to customizing users is also referred to as customizing authorization. An authorization granted to master users is also referred to as master authorization. Note that master authorization is an example of a first authorization. Customizing authorization is an example of a second authorization. The server 300 may grant authorizations to users based on various types of information, such as their usage history of the inhaler devices 100, history of generating heating profiles, or applications from the users.

General users are users with the authorization to use a default heating profile. The default heating profile is, for example, a heating profile pre-installed in the inhaler device 100. Selected users are users with the authorization to use heating profiles created by other users, in addition to the authorization that general users have. Customizing users and master users are users with the authorization to customize (i.e., create) heating profiles, in addition to the authorization that selected users have. Customizing a heating profile refers to creating a heating profile that achieves a preferred smoke taste by making modifications based on an existing heating profile.

General users and selected users can easily enjoy the smoke taste by using existing heating profiles. On the other hand, customizing users and master users can enjoy the pleasure of creating and using heating profiles that achieve their favorite smoke tastes. In this way, it becomes possible to provide each user with his/her desired experience by varying the authorization granted to each user.

Customizing users or master users operate their terminal devices 200 to create heating profiles. The server 300 may publish the heating profiles created by the users on the web to be downloadable. The server 300 may further sell the heating profiles created by the users and return rewards to the users based on the sales. By configuring an ecosystem for the generation of heating profiles as such, it becomes possible to motivate more users to create heating profiles, thereby providing many high-quality heating profiles to users. In this way, the overall satisfaction of all users can be improved.

Here, master users are favored over customizing users in various aspects, such as having a higher degree of freedom to create heating profiles compared to customizing users. Master users are sophisticated users among those who customize heating profiles, especially those recognized by other users for generating high-quality heating profiles. Master users can also be said to be those with a high level of proficiency in generating heating profiles compared to customizing users. Favoring master users in various aspects can motivate users to create numerous high-quality heating profiles. As a result, a large number of high-quality heating profiles are supplied, which makes it possible to improve overall satisfaction of all users.

The server 300 stores users and authorizations granted to them in association. For example, the server 300 stores each user's identification information in association with the authorization granted to the user. The terminal device 200 may also store the authorization granted to the user of the terminal device 200. The terminal device 200 accepts an operation for generating a heating profile. For example, the terminal device 200 accepts an operation to set a target temperature at a certain time (an elapsed time since the start of heating). The terminal device 200 or the server 300 then generates a heating profile based on the operation accepted by the terminal device 200.

However, at least one of the terminal device 200 or the server 300 performs processing regarding the generation of a heating profile in accordance with the authorization granted to the user of the terminal device 200. In detail, at least one of the terminal device 200 or the server 300 performs different processing depending on whether the user of the terminal device 200 is a master user or a customizing user, as processing regarding the generation of a heating profile. For example, the terminal device 200 or the server 300 may provide a customization method with a high degree of freedom to master users and a customization method with a low degree of freedom to customizing users. When customizing a heating profile, the burden on users is greater with a higher degree of freedom in the customization method and lower with a lower degree of freedom in the customization method. In this regard, according to such a configuration, customizing users can easily customize a heating profile. On the other hand, master users can pursue the ideal heating profile while enjoying the high burden involved in customizing it. In this way, by providing a customization method according to the granted authorization, it becomes possible to provide a customizing experience suitable for each user.

The following describes an example of processing regarding the generation of a heating profile that differs between master users and customizing users.

First Example

The terminal device 200 accepts the setting of a target temperature from the user. Either the terminal device 200 or the server 300 then generates a heating profile that reflects the target temperature set by the user. However, the time at which the target temperature can be set (i.e., the elapsed time since the start of heating) may differ between master users and customizing users.

In detail, the terminal device 200 may accept an operation from a master user to set a target temperature at an arbitrary time. That is, the timing at which a master user can set a target temperature may not be limited to the timing at which puffing is performed (hereinafter also referred to as puff timing). For example, the terminal device 200 may display the graph 20 depicting the heating profile illustrated in FIG. 5 as a heating profile before modifications, and generate a modified heating profile in response to a user operation. In detail, the terminal device 200 may accept a user operation to select any point on the line 21 in the graph 20 and move it upward or downward. The terminal device 200 may then change the target temperature at a time specified by the user in response to the aforementioned user operation.

On the other hand, the terminal device 200 may accept an operation to set a target temperature at puff timing from a customizing user. That is, the timing at which a customizing user can set a target temperature may be limited to puff timing. For example, the terminal device 200 may display the graph 20 depicting the heating profile illustrated in FIG. 5, and accept a user operation to select a point corresponding to puff timing on the line 21 in the graph 20 and move it upward or downward. The terminal device 200 may then change the target temperature at puff timing in response to the aforementioned user operation.

According to such a configuration, since customizing users can set a target temperature only at puff timing, which greatly affects the smoke taste, they can achieve their desired smoke tastes with a relatively light burden. On the other hand, since master users can set a target temperature at timings other than puff timings, they can pursue optimal smoke tastes.

Second Example

The terminal device 200 accepts the setting of a target temperature from the user. Either the terminal device 200 or the server 300 then generates a heating profile that reflects the target temperature set by the user. However, the entity responsible for generating a heating profile may differ between master users and customizing users.

In detail, the terminal device 200 may generate a heating profile based on an operation by a master user. That is, the terminal device 200 may accept the setting of a target temperature by a master user and generate a heating profile that faithfully reflects the set target temperature. For example, the terminal device 200 may display the graph 20 depicting the heating profile illustrated in FIG. 5, and accept a user operation to select a point corresponding to puff timing on the line 21 in the graph 20 and move it upward or downward. The terminal device 200 may then change the target temperature at puff timing in response to the aforementioned user operation.

The system 1 repeats the heating based on the heating profile by the inhaler device 100 and the acceptance of user operations and modifications of the heating profile by the terminal device 200 until the user is satisfied with the smoke taste. This allows the master user to pursue a heating profile that achieves his/her preferred smoke taste through repeated trial and error.

On the other hand, the server 300 may generate a heating profile based on a customizing user's operation on the terminal device 200. At that time, the terminal device 200 may accept an input of information for reference, rather than the setting of a specific target temperature. The server 300 may then set a target temperature with reference to the input information. For example, the terminal device 200, upon accepting a customizing user's evaluation of the smoke taste, May send the accepted evaluation of the smoke taste to the server 300. Then, based on the evaluation of the smoke taste received from the terminal device 200, the server 300 may generate a heating profile that improves the evaluation of the smoke taste. An example of an input screen for smoke taste evaluation will be described with reference to FIG. 7.

FIG. 7 is a diagram illustrating an example of an input screen for smoke taste evaluation, displayed by the terminal device 200 according to the present embodiment. An input screen 30 is displayed while performing heating based on a heating profile. An arrow 31 extends to the right on an axis 32 as time elapses from the start of heating. A mark 33 indicating that puff timing has arrived may overlap with the arrow 31 at a position corresponding to the arrived puff timing. Numerals appended with "#", i.e., "#N", which are displayed as a scale on the axis 32, correspond to the N-th puff timings. When the tip of arrow 31 reaches the same position as each of the numerals appended with "#", i.e., "#N", it means that the N-th puff timing has arrived. It is displayed on the input screen 30 illustrated in FIG. 7 that the fourth puff timing has arrived.

When puff timing arrives, the terminal device 200 vibrates and displays a notification 34 that prompts the user to perform a puff and input an evaluation of the smoke taste. The terminal device 200 then displays buttons 35 for inputting an evaluation of the smoke taste at a position corresponding to the arrived fourth puff timing. The user can select one of the buttons 35 as an evaluation of the smoke taste intensity: "strong," "mild," or "weak". Furthermore, the user can select one of the buttons 35 as an overall review of the smoke taste: "pleasant" or "unpleasant".

On the input screen 30, the input results of evaluations of the smoke taste at past puff timings may be displayed. On the input screen 30 illustrated in FIG. 7, it is displayed that "strong" and "pleasant" have been selected at the first to third puff timings that have already passed.

The server 300 modifies the heating profile based on the evaluation of the smoke taste input to the terminal device 200. In an example, the server 300 may modify the heating profile to reduce the target temperature at puff timing at which "strong" is input, thereby making the smoke taste weaker at the puff timing. In another example, the server 300 may modify the heating profile to raise the target temperature at puff timing at which "weak" is input, thereby making the smoke taste stronger at the puff timing. The system 1 repeats the heating based on the heating profile by the inhaler device 100, the acceptance of inputs of evaluation of the smoke taste by the terminal device 200, and modifications of the heating profile by the server 300 until the user is satisfied with the smoke taste. Customizing users can easily create a heating profile that achieves their preferred smoke tastes by simply inputting evaluations of the smoke taste repeatedly.

According to such a configuration, it becomes possible to provide master users with a high degree of freedom to pursue the optimal smoke taste. On the other hand, it becomes possible to reduce the burden on customizing users in pursuing their desired smoke tastes.

The flow of a heating profile generation process based on an operation by a master user and a heating profile generation process based on an operation by a customizing user will be described below with reference to FIGS. 8 and 9.

Figure 8:
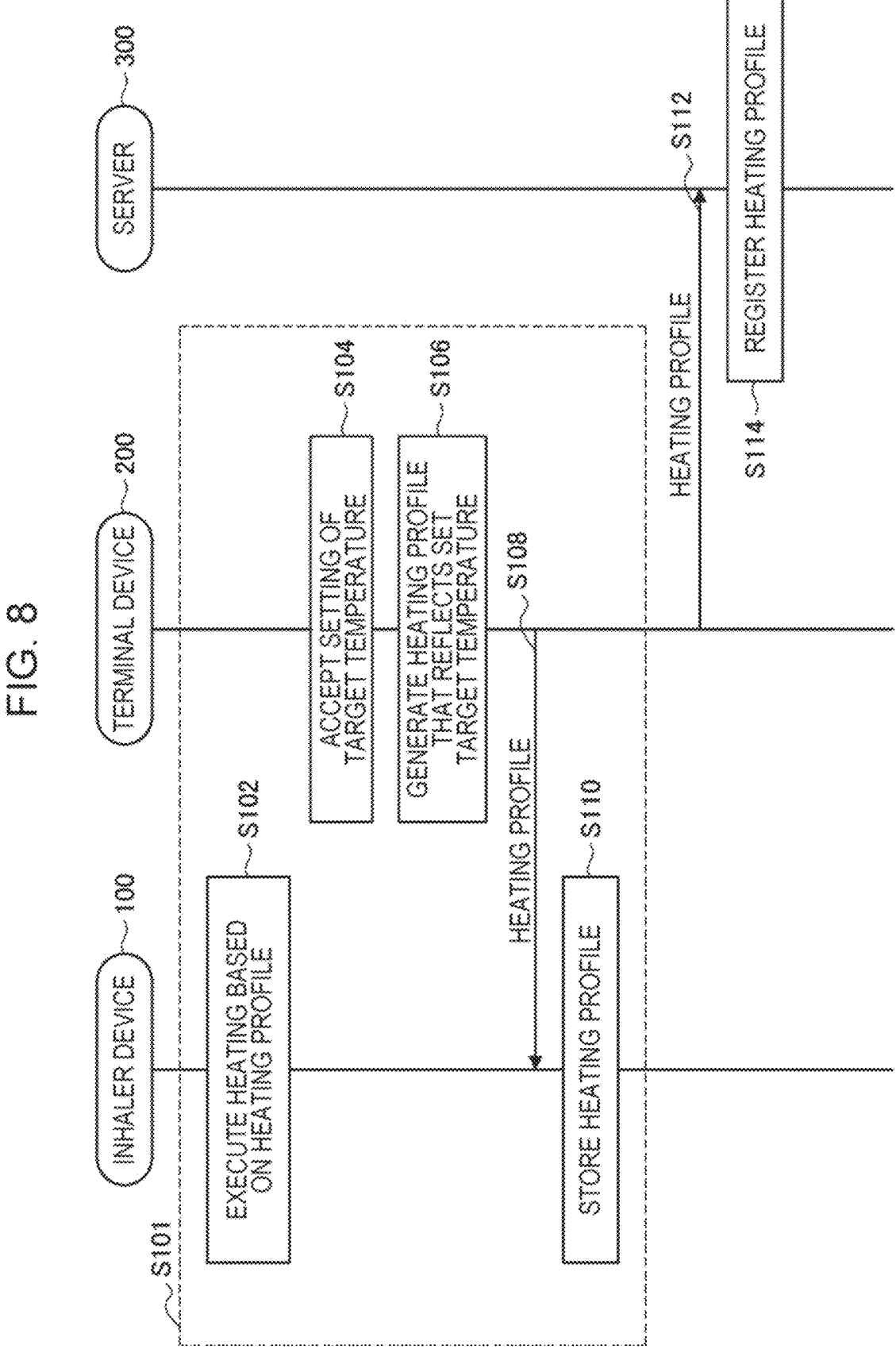
FIG. 8 is a sequence diagram illustrating an example of the flow of a heating profile generation process based on an operation by a master user.

FIG. 8 is a sequence diagram illustrating an example of the flow of a heating profile generation process based on an operation by a master user. In this sequence, the inhaler device 100, the terminal device 200, and the server 300 are involved.

As illustrated in FIG. 8, first, the inhaler device 100 and the terminal device 200 perform the processing according to step S101. In detail, the inhaler device 100 first executes heating based on a heating profile (step S102). The terminal device 200 then accepts the setting of a target temperature (step S104). Next, the terminal device 200 generates a heating profile that reflects the set target temperature (step S106). The terminal device 200 then sends the generated heating profile to the inhaler device 100 (step S108). Then, the inhaler device 100 stores the heating profile received from the terminal device 200 (step S110). This allows the inhaler device 100 to heat the stick substrate 150 based on the new heating profile from the next time.

The inhaler device 100 and the terminal device 200 execute the processing according to step S101 repeatedly until the master user is satisfied with the smoke taste. This allows the master user to create a heating profile that achieves his/her preferred smoke taste through repeated trial and error.

Once the generation of the heating profile is completed, the terminal device 200 sends the generated heating profile to the server 300 (step S112).

The server 300 then registers the received heating profile (step S114). For example, the server 300 assigns new identification information to the heating profile and stores the heating profile, the identification information (hereinafter also referred to as the profile ID) of the heating profile, and the identification information (hereinafter also referred to as the user ID) of the user who created the heating profile in association with one another. The server 300 may publish the registered heating profile on a webpage to be downloadable. By associating the profile ID and the user ID, it becomes easier to aggregate the number of downloads or the number of uses for each user.

Figure 9:
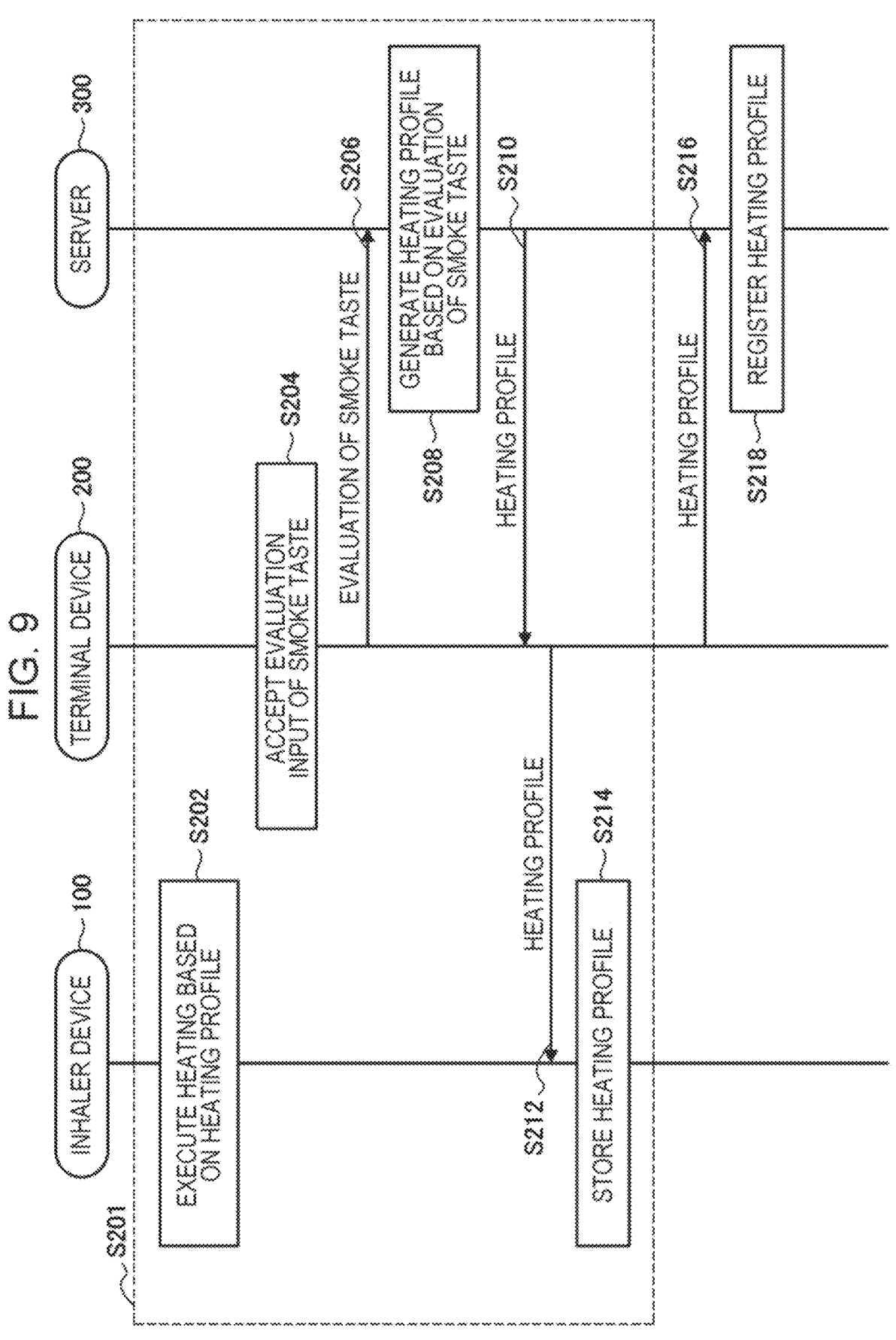
FIG. 9 is a sequence diagram illustrating an example of the flow of a heating profile generation process based on an operation by a customizing user.

FIG. 9 is a sequence diagram illustrating an example of the flow of a heating profile generation process based on an operation by a customizing user. In this sequence, the inhaler device 100, the terminal device 200, and the server 300 are involved.

As illustrated in FIG. 9, first, the inhaler device 100, the terminal device 200 and the server 300 perform the processing according to step S201. In detail, the inhaler device 100 first executes heating based on a heating profile (step S202). The terminal device 200 then accepts an evaluation input of the smoke taste (step S204). Next, the terminal device 200 sends the input evaluation of the smoke taste to the server 300 (step S206). The server 300 then generates a heating profile based on the evaluation of the smoke taste (step S208). The server 300 then sends the generated heating profile to the terminal device 200 (step S210). Next, the terminal device 200 sends the received heating profile to the inhaler device 100 (step S212). Then, the inhaler device 100 stores the heating profile received from the terminal device 200 (step S214). This allows the inhaler device 100 to heat the stick substrate 150 based on the new heating profile from the next time.

The inhaler device 100, the terminal device 200, and the server 300 execute the processing according to step S201 repeatedly until the customizing user is satisfied with the smoke taste. This makes it possible for the customizing user to easily create a heating profile that achieves his/her preferred smoke taste by simply inputting an evaluation of the smoke taste repeatedly.

Once the generation of the heating profile is completed, the terminal device 200 sends the generated heating profile to the server 300 (step S216).

The server 300 then registers the received heating profile (step S218).

Although the example in which a customizing user inputs an evaluation of the smoke taste has been described above, the present invention is not limited to such an example. A customizing user may input information instructing the target temperature to be raised or lowered, along with or instead of an evaluation of the smoke taste. However, such information is used for reference only, and the specific target temperature is set by the server 300.

Third Example

Generated heating profiles may be interchangeable between users.

Heating profiles created by users may be indirectly exchanged with other users via a webpage operated by the server 300. For example, the server 300 may publish heating profiles created by users on a webpage to be downloadable. Users access the webpage using their terminal devices 200, download heating profiles created by other users to their inhaler devices 100, and use them.

Alternatively, heating profiles created by users may be exchanged directly between users. For example, users may directly or indirectly download and use heating profiles created by other users from other users' inhaler devices 100 or terminal devices 200 to their inhaler devices 100 or terminal devices 200. Direct exchange of heating profiles between users may use short-range wireless communication, such as BLE (Bluetooth Low Energy (registered trademark)) or NFC (Near Field Communication).

However, there may be differences in the means by which heating profiles created by master users and those created by customizing users can be exchanged between users.

In an example, the server 300 may publish heating profiles generated based on operations by master users on the web to be downloadable. That is, the server 300 may not publish heating profiles generated based on operations by customizing users on the web. On the other hand, the inhaler device 100 or the terminal device 200 may receive heating profiles generated based on operations by master users or customizing users from other inhaler devices 100 or other terminal devices 200. That is, heating profiles may be exchanged directly between users, regardless of whether the creator is a master user or a customizing user. With such a configuration, heating profiles created by master users with excellent sensibility can be widely circulated through a webpage. On the other hand, by allowing friends to freely exchange heating profiles with each other, it becomes possible to provide many users with the pleasure of creating and enjoying heating profiles.

Fourth Example

The server 300 may reward users who generated heating profiles. In detail, the server 300 stores users and rewards awarded to them in association with each other. An example of the rewards is points that can be used as credit to purchase heating profiles published on the web.

In an example, the server 300 may publish heating profiles created by master users or customizing users on a webpage to be downloadable. The server 300 may then reward the users according to the number of downloads of the heating profiles created by them. Specifically, the server 300 grants a higher reward as the number of downloads increases.

In another example, the server 300 may collect from the inhaler devices 100 the identification information and number of uses of heating profiles used. The server 300 may then aggregate the number of uses of the heating profiles and give rewards according to the number of uses. Specifically, the server 300 grants a higher reward as the number of uses increases. According to such a configuration, it becomes possible to motivate master users and customizing users to create higher-quality heating profiles.

However, the unit price of rewards granted to master users may be higher than the unit price of rewards granted to customizing users. In detail, the reward per download granted to master users may be higher than the reward per download granted to customizing users. Similarly, the reward per use granted to master users may be higher than the reward per use granted to customizing users. Alternatively, rewards based on the number of downloads or uses may be granted only to master users and not to customizing users. According to such a configuration, it becomes possible to motivate customizing users to aspire to become master users. As a result, it becomes possible to motivate master users and customizing users to create higher-quality heating profiles.

Fifth Example

The terminal device 200 may accept the setting of comments regarding the generated heating profiles. For example, the terminal device 200 accepts the setting of a comment describing a heating profile created by its user. Examples of comments include light, heavy, sweet, spicy, mellow, smooth, strongly acidic, bitter, refreshing, or roasty. Then, the server 300 may, when publishing a heating profile created by a master user or a customizing user on a webpage to be downloadable, append the set comment as a description of the heating profile. By setting excellent 15 comments, heating profiles can be made more easily downloadable by a larger number of users.

However, the types of comments that master users can set may be more numerous than those that customizing users can set. For example, master users may be able to set free sentences as comments. On the other hand, customizing users may be allowed to select keywords from given keywords, such as light or heavy, to set as comments. According to such a configuration, it becomes possible to receive comments that demonstrate master users' excellent sensibility. On the other hand, it becomes possible to reduce the burden on customizing users in setting comments.

Sixth Example

The terminal device 200 accepts the setting of a target temperature from the user. Either the terminal device 200 or the server 300 then generates a heating profile that reflects the target temperature set by the user. However, there may be differences in the granularity of a target temperature that master users and customizing users can set.

In detail, the granularity of a target temperature that master users can set may be finer than the granularity of a target temperature that customizing users can set. For example, a target temperature that master users can set may be in units of 1° C., whereas the granularity of a target temperature that customizing users can set may be in units of 10° C. According to such a configuration, it becomes possible to provide master users with a wide range of options to pursue the optimal smoke taste. On the other hand, by providing customizing users with a narrower range of options, it becomes possible to reduce the burden in pursuing their desired smoke tastes. Additionally, by providing master users with a wider range of options compared to customizing users as mentioned above, it becomes possible to motivate customizing users who want to pursue the optimal smoke taste to aspire to become master users.

Seventh Example

The terminal device 200 accepts the setting of a target temperature from the user. Either the terminal device 200 or the server 300 then generates a heating profile that reflects the target temperature set by the user. However, there may be differences in the range of a target temperature that master users and customizing users can set.

In detail, the range of a target temperature that master users can set may be wider than the range of a target temperature that customizing users can set. For example, master users may be able to set a target temperature in the range of 100° C. to 350° C. On the other hand, customizing users may be able to set a target temperature in the range of 200° C. to 300° C. According to such a configuration, it becomes possible to provide master users with a wide range of options to pursue the optimal smoke taste. On the other hand, by providing customizing users with a narrower range of options, it becomes possible to reduce the burden in pursuing their desired smoke tastes. Additionally, by providing master users with a wider range of options compared to customizing users as mentioned above, it becomes possible to motivate customizing users who want to pursue the optimal smoke taste to aspire to become master users.

Eighth Example

The terminal device 200 accepts the setting of a target temperature from the user. Either the terminal device 200 or the server 300 then generates a heating profile that reflects the target temperature set by the user. However, there may be differences in the range of time during which a target temperature can be set (elapsed time since the start of heating) between master users and customizing users.

In detail, the range of time during which master users can set a target temperature may be wider than the range of time during which customizing users can set a target temperature. For example, master users may be able to set a target temperature at an arbitrary time during a heating session. On the other hand, customizing users can set a target temperature in an intermediate cooling period and a re-heating period, which means that the setting of a target temperature in an initial heating period may be limited. This is because a target temperature in an initial heating period has a significantly greater impact on the entire heating session compared to a target temperature in other periods. According to such a configuration, it becomes possible to provide master users with a wide range of options to pursue the optimal smoke taste. On the other hand, by providing customizing users with a narrower range of options, it becomes possible to reduce the burden in pursuing their desired smoke tastes. Additionally, by providing master users with a wider range of options compared to customizing users as mentioned above, it becomes possible to 10) motivate customizing users who want to pursue the optimal smoke taste to aspire to become master users.

Ninth Example

The server 300 may publish heating profiles created by master users or customizing users on a webpage to be downloadable. However, there may be differences in the publication time of heating profiles between master users and customizing users.

In detail, the server 300 may publish heating profiles regarding a particular inhaler device 100 or a particular stick substrate 150, generated based on operations by master users, to be downloadable at a time earlier than heating profiles generated based on operations by customizing users. Additionally, the server 300 may accept the registration of heating profiles created by master users regarding a particular inhaler device 100 or a particular stick substrate 150 at a time earlier than heating profiles created by customizing users. An example of a particular inhaler device 100 is a newly released inhaler device 100. Moreover, an example of a particular stick substrate 150 is a newly released stick substrate 150.

In an example, heating profiles created by master users may be published concurrently with or immediately after the release of a new inhaler device 100 or a new stick substrate 150. Master users may be offered a prototype of a new inhaler device 100 or a new stick substrate 150 before its release by the manufacturer, and they may be asked to create heating profiles. In that case, master users can take time to create heating profiles for the new inhaler device 100 or the new stick substrate 150 before its release, and they can pre-register the heating profiles with the server 300. In this case, the server 300 can publish the heating profiles created by master users on the web to be downloadable, concurrently with or immediately after the release of the new inhaler device 100 or the new stick substrate 150.

On the other hand, heating profiles created by customizing users may be published after the release of a new inhaler device 100 or a new stick substrate 150, such as after a predetermined period, e.g., one month, has passed since the release. Customizing users may purchase a new inhaler device 100 or a new stick substrate 150 on their own after its release, create heating profiles, and register the heating profiles with the server 300. In this case, the server 300 will publish the heating profiles created by customizing users on the web to be downloadable after a certain period has passed since the release of the new inhaler device 100 or the new stick substrate 150.

Needless to say, master users, as well as customizing users, can also create heating profiles for inhaler devices 100 or stick substrates 150 that are available on sale. In that case, heating profiles are published on the web to be downloadable as soon as they are created.

Miscellaneous

The server 300 may appropriately switch the authorization granted to users in accordance with, for example, the usage history of heating profiles created by the users.

In an example, the server 300 may switch the authorization granted to users based on the number of downloads of heating profiles generated based on operations by the users. In detail, the server 300 may publish heating profiles created by master users or customizing users on a webpage to be downloadable. The server 300 may then grant master authorization to users who have created heating profiles with a high number of downloads, ranking in the top few percent, and may grant customizing authorization to other users.

In another example, the server 300 may switch the authorization granted to users according to the number of uses of heating profiles generated based on operations by the users. In detail, the server 300 may collect identification information and number of uses of the heating profiles used from the inhaler devices 100. The server 300 may then aggregate the number of uses of the heating profiles, grant master authorization to users who have created heating profiles with a high number of uses, ranking in the top few percent, and grant customizing authorization to other users.

In another example, the server 300 may switch the authorization granted to users in response to ratings from other users of heating profiles generated based on operations by the users. In detail, the server 300 may accept a five-star rating from users for heating profiles created by other users. The server 300 may then aggregate the ratings obtained for each user, grant master authorization to the top few percent of highly rated users, and grant customizing authorization to other users.

The server 300 may switch the authorization granted to users based on a combination of two or more of the number of downloads, the number of uses, or the ratings, as mentioned earlier.

Based on the example described above, users with a high number of downloads or a high number of uses, or highly rated users are granted master authorization, which is favored over customizing authorization in various aspects. As such, it becomes possible to motivate master users and customizing users to create higher-quality heating profiles in order to increase the number of downloads or the number of uses, or to enhance the ratings.

3. Supplement

Although the preferred embodiment of the present invention has been described in detail above with reference to the accompanying drawings, the present invention is not limited to such an example. It is obvious that those with ordinary skill in the art to which the present invention pertains may conceive various modifications or variations within the scope of the technical concepts described in the claims, and these are understood to naturally fall within the technical scope of the present invention.

Although an example in which the heater 121 is configured as a heat generating resistor and is heated by electrical resistance has been described in the above embodiment, the present invention is not limited to such an example. For example, the heater 121 may include an electromagnetic induction source, such as a coil that generates a magnetic field, and a susceptor that produces heat by the induction heating, and the susceptor may heat the stick substrate 150. In this case, the controller 116 applies an alternating current to the electromagnetic induction source to generate an alternating magnetic field, and allows the alternating magnetic field to penetrate the susceptor, thereby causing the susceptor to produce heat. In this case, the temperature at which the aerosol source is heated, which is controlled based on a heating profile, is the temperature of the susceptor. The temperature of the susceptor can be estimated based on the electrical resistance of the electromagnetic induction source.

Although an example in which a parameter regarding the temperature at which the aerosol source is heated, as defined in a heating profile, is the target temperature of the heater 121 has been described in the above embodiment, the present invention is not limited to such an example. Parameters regarding the temperature at which the aerosol source is heated include, in addition to the temperature of the heater

121 itself described in the above embodiment, the electrical resistance of the heater 121. Also, if the inhaler device 100 includes an electromagnetic induction source instead of the heater 121, parameters regarding the temperature at which the aerosol source is heated, as defined in a heating profile, include a target value such as the temperature of the 10) susceptor or the electrical resistance of the electromagnetic induction source.

Although an example in which the inhaler device 100 heats the stick substrate 150 to generate an aerosol has been described in the above embodiment, the present invention is not limited to such an example. The inhaler device 100 may be configured as a so-called liquid atomization type aerosol generator that generates an aerosol by heating and atomizing an aerosol source as a liquid. The present invention is also applicable to a liquid atomization type aerosol generator.

As described above, a heating profile is generated by the terminal device 200 or the server 20) 300. Here, the generation of a heating profile by the terminal device 200 may refer to the generation of a heating profile by a native application installed on the terminal device 200. Additionally, the generation of a heating profile by the terminal device 200 may refer to the generation of a heating profile by PWA (Progressive Web Apps) provided for the terminal device 200. Here, the provider of the PWA may be the server 300. That is, the generation of a heating profile by the server 300 may refer to the generation of a heating profile by PWA (Progressive Web Apps) provided for the terminal device 200.

Note that a series of processes performed by each of the devices described in the present specification may be implemented using any of software, hardware, and a combination of software and hardware. Programs constituting the software are pre-stored, for example, on a recording medium (specifically, a computer-readable non-transitory storage medium) provided inside or outside each device. Each program is then loaded into a RAM upon execution by, for example, a computer controlling each device described in the present specification, and executed by a processing circuit, such as a CPU. The recording medium includes, for example, a magnetic disk, an optical disk, a magneto-optical disk, a flash memory, and the like. Additionally, the computer programs mentioned above may also be delivered, for example, over a network, without the use of a recording medium. Moreover, the computer mentioned above may be an application-specific integrated circuit such as an ASIC, a general-purpose processor that executes functions by loading software programs, a computer on a server used for cloud computing, or the like. Also, a series of processes performed by each device described in the present specification may be distributed among and processed by multiple computers.

Furthermore, the processes described using flowcharts and sequence diagrams in the present specification may not necessarily be executed in the order illustrated. Some processing steps may be executed in parallel. Moreover, additional processing steps may also be employed, and some of the processing steps may be omitted.

The following configurations also fall within the technical scope of the present invention.

(1)

A system comprising:

an inhaler device that generates an aerosol by heating an aerosol source based on control information defining a parameter regarding a temperature at which the aerosol source is heated;

21 a terminal device that accepts an operation for generating the control information; and a control device that stores a user and an authorization granted to the user in association, wherein at least one of the terminal device or the control device performs processing regarding generation of the control information according to the authorization granted to a user of the terminal device.

(2)

The system according to (1) described above, wherein:

the control information includes information defining a time series transition of the parameter; and the terminal device accepts an operation to set a target temperature at an arbitrary time from a first authorized user and an operation to set a target temperature at puff timing from a second authorized user different from the first authorized user.

(3)

The system according to (1) or (2) described above, wherein:

the terminal device generates the control information based on an operation by a first authorized user; and the control device generates the control information based on an operation on the terminal device by a second authorized user different from the first authorized user.

(4)

The system according to any one of (1) to (3) described above, wherein:

the control device publishes the control information generated based on an operation by a first authorized user on a web to be downloadable; and the inhaler device or the terminal device receives the control information generated based on an operation by the first authorized user or a second authorized user different from the first authorized user from another inhaler device or another terminal device.

(5)

The system according to (4) described above, wherein:

the control device grants a reward to a user according to a number of downloads or uses of the control information generated based on an operation by the user; and a unit price of the reward granted to the first authorized user is higher than a unit price of the reward granted to the second authorized user different from the first authorized user.

(6)

The system according to any one of (1) to (5) described above, wherein:

the terminal device accepts setting of a comment for the generated control information; and types of the comment that a first authorized user can set are more numerous than types of the comment that a second authorized user different from the first authorized user can set.

(7)

The system according to any one of (1) to (6) described above, wherein:

the terminal device accepts setting of the parameter from a user; and granularity of the parameter that a first authorized user can set is finer than granularity of the parameter that a second authorized user different from the first authorized user can set.

(8)

The system according to any one of (1) to (7) described above, wherein:

the terminal device accepts setting of the parameter from a user; and a range of the parameter that a first authorized user can set is wider than a range of the parameter that a second authorized user different from the first authorized user can set.

(9)

The system according to any one of (1) to (8) described above, wherein:

the control information includes information defining a time series transition of the parameter; and a range of time during which a first authorized user can set the parameter is wider than a range of time during which a second authorized user different from the first authorized user can set the parameter.

(10)

The system according to any one of (1) to (9) described above, wherein:

the control device switches the authorization granted to a user according to at least one of a number of downloads, a number of uses, or a rating from another user of the control information generated based on an operation by the user.

(11)

The system according to any one of (1) to (10) described above, wherein:

the inhaler device generates the aerosol using a substrate including the aerosol source; and the control device publishes the control information regarding a particular inhaler device or a particular substrate, generated based on an operation by a first authorized user, on a web to be downloadable at a time earlier than the control information generated based on an operation by a second authorized user.

(12)

An information processing method comprising:

storing a user and an authorization granted to the user in association;

accepting an operation for generating control information defining a parameter regarding a temperature at which an aerosol source is heated, the control information being used by an inhaler device that generates an aerosol by heating the aerosol source based on the control information; and performing processing regarding generation of the control information according to the authorization granted to the user.

REFERENCE SIGNS LIST 1 system
100 inhaler device
111 power supply
112 sensor
113 notifier
114 memory
115 communicator
116 controller
121 heater
140 holder
141 internal space
142 opening
143 bottom
144 heat insulator
150 stick substrate
151 substrate
152 inhalation port 200 terminal device
210 input unit
220 output unit
230 detector
240 communicator
250 memory
260 controller
300 server
310 communicator
320 memory
330 controller
900 network

The invention claimed is:

1. A system comprising:
an inhaler device that generates an aerosol by heating an aerosol source based on control information defining a parameter regarding a temperature at which the aerosol source is heated;
a terminal device that accepts an operation for generating the control information; and
a control device that stores a user and an authorization granted to the user in association, wherein
at least one of the terminal device or the control device performs processing regarding generation of the control information according to the authorization granted to a user of the terminal device,
the control information includes information defining a time series transition of the parameter; and
the terminal device accepts an operation to set a target temperature at an arbitrary time from a first authorized user and an operation to set a target temperature at puff timing from a second authorized user different from the first authorized user.

2. The system according to claim 1, wherein:
the terminal device generates the control information based on an operation by a first authorized user; and
the control device generates the control information based on an operation on the terminal device by a second authorized user different from the first authorized user.

3. The system according to claim 1, wherein:
the control device publishes the control information generated based on an operation by a first authorized user on a web to be downloadable; and
the inhaler device or the terminal device receives the control information generated based on an operation by the first authorized user or a second authorized user different from the first authorized user from another inhaler device or another terminal device.

4. The system according to claim 3, wherein:
the control device grants a reward to a user according to a number of downloads or uses of the control information generated based on an operation by the user; and
a unit price of the reward granted to the first authorized user is higher than a unit price of the reward granted to the second authorized user different from the first authorized user.

5. The system according to claim 1, wherein:
the terminal device accepts setting of a comment for the generated control information; and
types of the comment that a first authorized user can set are more numerous than types of the comment that a second authorized user different from the first authorized user can set.

6. The system according to claim 1, wherein:
the terminal device accepts setting of the parameter from a user; and granularity of the parameter that a first authorized user can set is finer than granularity of the parameter that a second authorized user different from the first authorized user can set.

7. The system according to claim 1, wherein:
the terminal device accepts setting of the parameter from a user; and
a range of the parameter that a first authorized user can set is wider than a range of the parameter that a second authorized user different from the first authorized user can set.

8. The system according to claim 1, wherein:
the control information includes information defining a time series transition of the parameter; and
a range of time during which a first authorized user can set the parameter is wider than a range of time during which a second authorized user different from the first authorized user can set the parameter.

9. The system according to claim 1, wherein:
the control device switches the authorization granted to a user according to at least one of a number of downloads, a number of uses, or a rating from another user of the control information generated based on an operation by the user.

10. The system according to claim 1, wherein:
the inhaler device generates the aerosol using a substrate including the aerosol source; and
the control device publishes the control information regarding a particular inhaler device or a particular substrate, generated based on an operation by a first authorized user, on a web to be downloadable at a time earlier than the control information generated based on an operation by a second authorized user.

11. An information processing method comprising:
storing a user and an authorization granted to the user in association;
accepting an operation for generating control information defining a parameter regarding a temperature at which an aerosol source is heated, the control information being used by an inhaler device that generates an aerosol by heating the aerosol source based on the control information; and
performing processing regarding generation of the control information according to the authorization granted to the user, wherein
the control information includes information defining a time series transition of the parameter; and
accepting the operation comprises accepting an operation to set a target temperature at an arbitrary time from a first authorized user and accepting an operation to set a target temperature at puff timing from a second authorized user different from the first authorized user.

12. A control device comprising:
a memory configured to store a user and an authorization granted to the user in association; and
circuitry configured to perform processing regarding generation of control information according to the authorization granted to the user, the control information defining a parameter regarding a temperature at which an aerosol source is heated and including information defining a time series transition of the parameter, wherein
the processing differs based on whether the user is a first authorized user or a second authorized user different from the first authorized user.

13. The control device according to claim 12, wherein the circuitry is configured to:

enable generation of the control information based on an operation to set a target temperature at an arbitrary time when the user is the first authorized user; and enable generation of the control information based on an operation to set a target temperature at puff timing when the user is the second authorized user.

14. The control device according to claim 12, wherein the circuitry is configured to generate the control information based on an operation on a terminal device by the second authorized user.

15. The control device according to claim 12, wherein the circuitry is configured to publish the control information generated based on an operation by the first authorized user on a web to be downloadable.

16. The control device according to claim 15, wherein the circuitry is configured to grant a reward to a user according to a number of downloads or uses of the control information generated based on an operation by the user, and a unit price of the reward granted to the first authorized user is higher than a unit price of the reward granted to the second authorized user.

17. The control device according to claim 12, wherein the circuitry is configured to switch the authorization granted to a user according to at least one of a number of downloads, a number of uses, or a rating from another user of the control information generated based on an operation by the user.

18. The control device according to claim 12, wherein the circuitry is configured to publish the control information regarding a particular inhaler device or a particular substrate, generated based on an operation by the first authorized user, on a web to be downloadable at a time earlier than the control information generated based on an operation by the second authorized user.

19. The control device according to claim 16, wherein the circuitry is configured to publish the control information generated based on an operation by the first authorized user on a web at a time earlier than the control information generated based on an operation by the second authorized user.

20. The control device according to claim 13, wherein the first authorized user is a master user and the second authorized user is a customizing user, and wherein the master user has a higher freedom level to create the control information than the customizing user.

\* \* \* \* \*